US010357803B2

(12) United States Patent
Greenwood (10) Patent No.: US 10,357,803 B2
(45) Date of Patent: Jul. 23, 2019

(54) METHOD AND APPARATUS FOR SEPARATING PLANT MATTER (71) Applicant: Zachariah Greenwood, Cazadero, CA (US)

(72) Inventor: Zachariah Greenwood, Cazadero, CA (US)

( * ) Notice: Subject to any disclaimer, the term of this patent is extended or adjusted under 35 U.S.C. 154(b) by 875 days.

(21) Appl. No.: 14/882,273

(22) Filed: Oct. 13, 2015

(65) Prior Publication Data

US 2017/0100748 A1 Apr. 13, 2017

(51) Int. Cl.
*B07B 7/00* (2006.01)
*A01G 17/02* (2006.01)
*B07B 1/00* (2006.01)
*B07B 4/08* (2006.01)

(52) U.S. Cl.
CPC .............. *B07B 7/00* (2013.01); *A01G 17/026* (2013.01); *B07B 1/00* (2013.01); *B07B 4/08* (2013.01); *B07B 2220/00* (2013.01)

(58) Field of Classification Search
CPC .... B07B 4/08; B07B 7/00; B07B 7/10; B07B 7/12; B07B 9/02; B07B 11/02; B07B 11/06; B07B 13/11; B07B 13/14; A01G 17/026; B02C 19/063; B02C 19/068; B02C 23/30
See application file for complete search history.

(56) References Cited

U.S. PATENT DOCUMENTS

| | | | | |
|---|---|---|---|---|
| 60,539 | A | * | 12/1866 | Morse ........................ B07B 1/42 |
| | | | | 209/364 |
| 476,234 | A | | 5/1892 | Myers |
| 1,792,962 | A | | 2/1931 | Barker |
| 2,499,693 | A | | 3/1950 | Stanton |
| 2,592,833 | A | | 4/1952 | Swanson |
| 2,718,744 | A | | 9/1955 | Phillips |
| 3,291,535 | A | | 12/1966 | Isbell |
| 3,420,046 | A | | 1/1969 | Johnson |
| 3,421,619 | A | * | 1/1969 | Chorne ..................... B07B 4/08 |
| | | | | 209/141 |
| 3,709,359 | A | * | 1/1973 | Johnson .................... B07B 7/01 |
| | | | | 209/138 |
| 3,729,096 | A | * | 4/1973 | Fitzner ..................... B07B 1/22 |
| | | | | 209/296 |
| 3,855,760 | A | | 12/1974 | Smith, Jr. |
| 3,927,479 | A | * | 12/1975 | Stephanoff ............ F26B 17/105 |
| | | | | 34/585 |
| 4,183,471 | A | | 1/1980 | Pfister |
| 4,885,898 | A | | 12/1989 | Khurgin |

(Continued)

FOREIGN PATENT DOCUMENTS

CN 203302241 11/2013

Primary Examiner — Joseph C Rodriguez
(74) Attorney, Agent, or Firm — Milord A. Keshishian (57) ABSTRACT An apparatus comprising a chamber having a smooth inner surface, the chamber including a first hemisphere and a second hemisphere, wherein the first hemisphere is removably attached to the second hemisphere; a plurality of apertures located on a bottom center surface of the second hemisphere; a plurality of nozzles, each of the plurality of nozzles having an inlet and an outlet, wherein each of the outlets penetrate the plurality of apertures without intersecting the smooth inner surface; an air compressor; a compressed air regulator; an air hose connected to each of the inlets of the plurality of nozzles and the air compressor.

10 Claims, 5 Drawing Sheets

(56) References Cited

U.S. PATENT DOCUMENTS

| | | | |
|---|---|---|---|
| 5,800,579 A | | 9/1998 | Billingsley |
| 6,158,591 A | * | 12/2000 | Delp .................. B01D 11/0257 209/17 |
| 6,594,982 B1 | | 7/2003 | Collard |
| 6,834,487 B2 | | 12/2004 | Pellenc |
| 7,305,812 B2 | | 12/2007 | Schloesser |
| 7,810,305 B2 | | 10/2010 | Macidull |
| 8,366,810 B1 | * | 2/2013 | Miller ....................... B07B 7/01 55/319 |
| 8,657,910 B2 | * | 2/2014 | Park ...................... A47L 9/1683 55/337 |
| 9,138,780 B2 | * | 9/2015 | Moosmann ............ B01D 45/12 |
| 9,308,556 B2 | * | 4/2016 | Grosjean ................ B07B 13/11 |
| 9,656,816 B2 | * | 5/2017 | Wilkinson .............. B04C 5/185 |
| 2014/0216989 A1 | * | 8/2014 | Raichart ................ B07B 1/288 209/235 |
| 2015/0047485 A1 | | 2/2015 | Schroeder |

* cited by examiner

METHOD AND APPARATUS FOR SEPARATING PLANT MATTER

CROSS-REFERENCE TO RELATED APPLICATIONS

N/A

BACKGROUND OF THE INVENTION

Field of the Invention

The present invention relates to horticulture management. More particularly, the present invention relates to a method and apparatus for separating plant matter.

Description of Related Art

In the art of horticulture, after harvesting plants, and specifically *cannabis* plants, the *cannabis* leaves need to be removed from the *cannabis* flowers. Currently, this process is mostly completed by hand using trimming shears. This process is extremely time-consuming, especially when dealing with a large amount of *cannabis* plants. Furthermore, hand trimming requires sitting for long periods of time with repetitive motions that may lead to back problems, injury, and hand pains.

There are several automated trimming machines designed to automatically trim *cannabis* plants, removing the *cannabis* leaves from the *cannabis* flowers. However, automated trimming machines use blades and techniques that are very damaging to the *cannabis* flowers. Consequently, there is a need for a method and apparatus for separating plant matter, and more specifically providing a simple, compact, inexpensive, and convenient device to quickly trim *cannabis* plants without damaging the *cannabis* flowers.

BRIEF SUMMARY OF THE INVENTION

In one embodiment of the present invention an apparatus for separating plant matter is provided comprising a chamber having a smooth inner surface, the chamber including a top portion that may be a first hemisphere in a preferred embodiment and a bottom portion (second hemisphere), wherein the first hemisphere is removably attached to the second hemisphere; a plurality of apertures located on a bottom center surface of the second hemisphere; a plurality of nozzles, each of the plurality of nozzles having an inlet and an outlet, wherein each of the outlets penetrate the plurality of apertures without intersecting the smooth inner surface; an air compressor; a compressed air regulator; an air hose connected to each of the inlets of the plurality of nozzles and the air compressor.

In one embodiment, the outlets of the plurality of nozzles are positioned on a downward slope of the second hemisphere and aimed at the center of the chamber. In another embodiment, a conduit in fluid communication with the chamber is provided. In one embodiment, the conduit is tangentially positioned in relation to the chamber. In one embodiment, the conduit is substantially U shaped comprising a first section and a second section, the first section is attached to the first hemisphere and the second section is attached to a removable collection device. In yet another embodiment, the removable collection device comprises a HEPA filter and a collection container. In one embodiment, the plant matter is placed into the chamber such that: compressed air forces the plant matter into a circular pattern, wherein the plant matter glides along the smooth inner surface of the chamber and passes over compressed air flow directed from the outlets of the plurality of nozzles separating the plant matter into a quantity of desirable plant matter and a quantity of undesirable plant matter as the plant matter. In another embodiment, the quantity undesirable plant matter enters the conduit and accumulates into the collection container.

In another aspect of the invention, a method is provided comprising steps (a) inserting a quantity of dry plant matter into a chamber having a smooth inner surface, the chamber including a first hemisphere and a second hemisphere, wherein the first hemisphere is removably attached to the second hemisphere, and the second hemisphere includes a plurality of apertures; (b) activating an air compressor, the air compressor connected to an air hose, wherein the air hose is attached to a plurality of nozzles, wherein the plurality of nozzles penetrate the plurality of apertures without intersecting the smooth inner surface; (c) engaging an air trigger for a predetermined amount of time releasing a blast of air through the plurality of nozzles into the chamber, the blast of air regulated via a compressed air regulator; (d) forcing the quantity of dry plant matter into a circular pattern along the smooth inner surface of the chamber and the blast of air such that the quantity of dry plant matter is separated into a quantity of desirable plant matter and a quantity of undesirable plant matter; and (e) releasing the air trigger after the predetermined amount time.

In one embodiment, in step (a), the chamber includes an attached conduit in fluid communication with the chamber. In one embodiment, in step (d), the quantity of dry plant matter is *cannabis*, the quantity of desirable plant matter is *cannabis* flowers, and the quantity of undesirable plant matter is *cannabis* leaves. In another embodiment, in step (d), the quantity of desirable plant matter is *cannabis* resin and the quantity of undesirable plant matter is *cannabis* leaves.

In one embodiment, a further step is provided in which the quantity of desirable plant matter and the quantity of undesirable plant matter are removed from the chamber and placed into a sieve. In another embodiment, the sieve includes a sieve opening at a size to allow the quantity of undesirable plant matter to pass through. In one embodiment, the quantity of undesirable plant matter is evacuated into the attached conduit. In another embodiment, a removable HEPA filter bag connected to the attached conduit is provided, wherein the quantity of undesirable plant matter is collected in the removable HEPA filter bag. In yet another embodiment, the removable HEPA filter bag collects a variety of unwanted particles including but not limited to dirt, dust, and spores.

In another aspect of the invention, a method for separating *cannabis* leaves from *cannabis* flowers is provided, comprising steps (a) inserting a quantity of dry untrimmed *cannabis* comprising attached *cannabis* leaves and *cannabis* flowers into a chamber having a smooth inner surface, the chamber including an attached U-shaped tube in fluid communication with the chamber, the chamber having a first hemisphere and a second hemisphere, wherein the first hemisphere is removably attached to the second hemisphere, and the second hemisphere includes a plurality of apertures; (b) activating an air compressor, the air compressor connected to an air hose, wherein the air hose is attached to a plurality of nozzles, wherein the plurality of nozzles penetrate the plurality of apertures without intersecting the smooth inner surface; (c) engaging an air trigger for a predetermined amount of time releasing a blast of air through the plurality of nozzles into the chamber, the blast of air regulated via a compressed air regulator; (d) forcing the quantity of dry untrimmed *cannabis* into a circular pattern along the smooth inner surface of the chamber and the blast of air such that the attached *cannabis* leaves are separated from the *cannabis* flowers creating a quantity of detached *cannabis* leaves; (e) evacuating the quantity of detached *cannabis* leaves into the attached U-shaped tube; and (f) releasing the air trigger after the predetermined amount time such that only the *cannabis* flowers remain in the chamber.

In one embodiment, in step (e), a removable HEPA filter bag connected to the attached U-shaped tube is provided. In another embodiment, the removable HEPA filter bag collects a variety of unwanted particles including but not limited to dirt, dust, and spores.

Such stated summary and advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE SEVERAL VIEWS OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments. Referring to the drawings in which like reference character(s) present corresponding part(s) throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
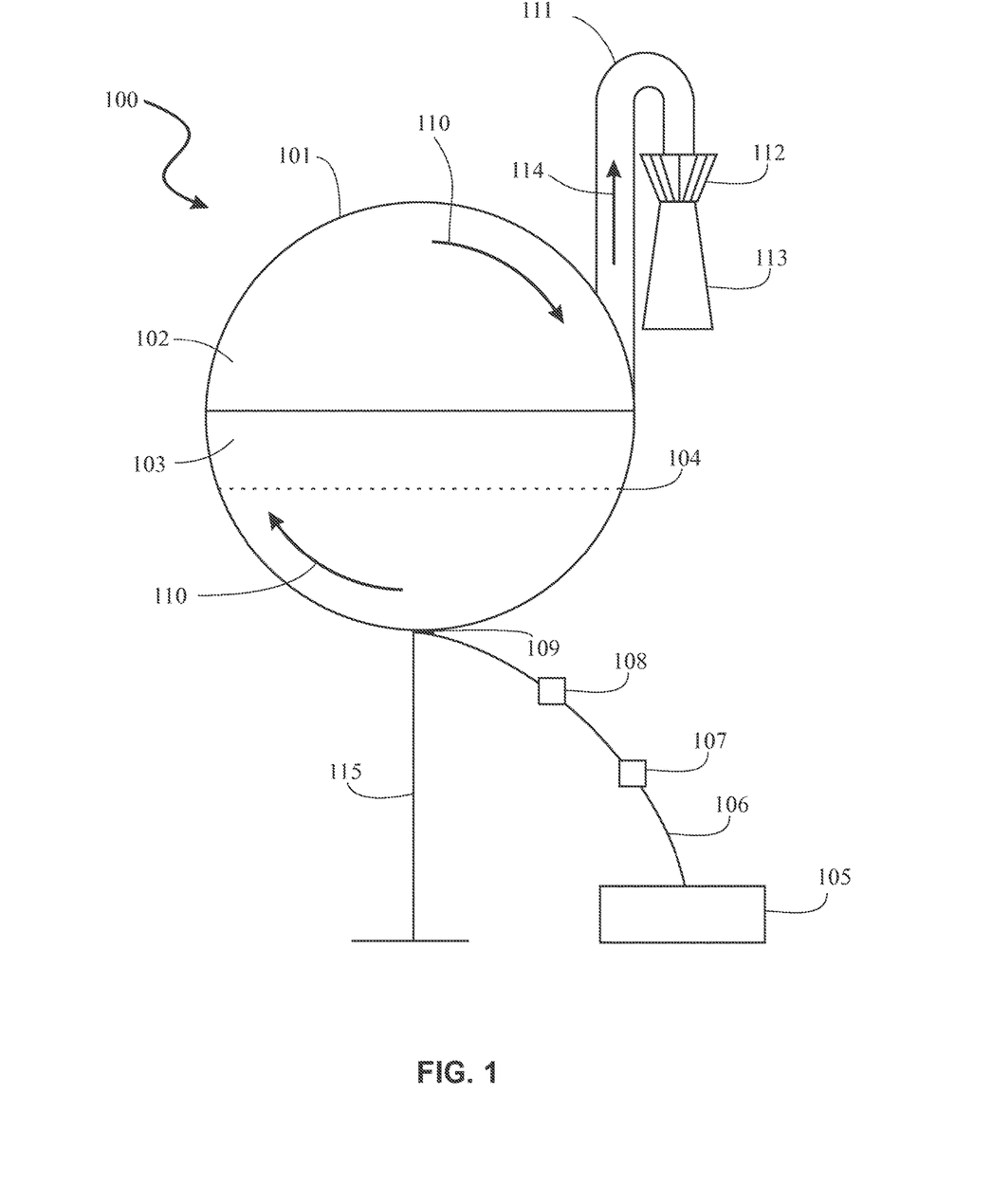
FIG. 1 is an exemplary diagram illustrating an apparatus for separating plant matter according to an embodiment of the present invention.

FIG. 1 is an exemplary diagram illustrating an apparatus 100 for separating plant matter according to an embodiment of the present invention. The apparatus comprises a chamber 101 having a top portion 102 and a bottom portion 103. The top portion is removably attached to the bottom portion in any method known in the art. For instance, the top portion may be attached via a hinge mechanism, or simply detached completely from the bottom portion when necessary. The chamber is made from a smooth material, including but not limited to plastic, acrylic, and glass. The inside surface of the chamber has a low coefficient of friction, having no edges or guides. In some embodiments, the chamber is transparent allowing a user to observe during operation. In a preferred embodiment, the chamber 101 is spherical but other embodiments, for purposes of illustration but not limitation, cylindrical, conical, torus, or spheroidal.

During use, dry plant matter is placed into the chamber, not exceeding a prescribed fill line 104. The dry plant matter can be a variety plant species; however the present invention works especially well with *cannabis* plants, and specifically dry untrimmed *cannabis*. Untrimmed *cannabis* includes *cannabis* flowers and *cannabis* leaves. When prescribed medical *cannabis* patients use *cannabis*, it is critical for the *cannabis* to be mostly free of *cannabis* leaves, as the *cannabis* leaves are generally harsh for the patients. Likewise, when removing *cannabis* leaves from *cannabis* flowers it is essential to retain as much of the *cannabis* flowers as possible, while preventing damage, to maintain the purity and potency of the *cannabis* flowers.

An air compressor 105 is used to deliver pressurized air to the chamber. It is preferred that the air compressor have a pressure capacity of at least 180 pounds per square inch (PSI). An air hose 106 is connected to the air compressor, the air hose having sufficient thickness necessary for the operating pressure, and sufficient length to reach the chamber. An air pressure regulator 107 designed to regulate and control the air pressure value, as well known in the art. During use, it is preferred that the air pressure regulator is set to 120 PSI. It is understood, that the operating pressure may be adjusted depending on requirements. The details of the operating pressure during use will be described in greater detail below.

A release trigger 108 is used to control the flow of compressed air to the chamber. Specifically, when the release trigger is activated, compressed air is allowed to pass through until the trigger is released. Connected to the end of the air hose is a plurality of nozzles designed to direct the compressed air flow into the chamber. The plurality of nozzles may be one or more nozzles, and preferably four nozzles. The outlets of the plurality of nozzles are positioned on bottom center of the chamber, and specifically aligned with a slope of the bottom portion such that the compressed air flows along the slope of the chamber. In some embodiments, the plurality of nozzles is positioned so the compressed air flows along the upward slope of the chamber. In alternative embodiments, the plurality of nozzles is positioned so the compressed air flows along the downward slope of the chamber. In some embodiments, the plurality of nozzles is positioned on the downward slope of the chamber and aimed at the center of the chamber. It is critical that the outlets of the plurality of nozzles do not enter the chamber. A plurality of apertures designed to match the position of the plurality of nozzles are drilled into the bottom center portion of the chamber. The apertures allow the nozzles, and specifically the compressed air to enter the chamber. As mentioned previously, it is critical that the chamber be free from guides, which includes the plurality of nozzles. The outlets of the nozzles are aligned to the inside surface of the chamber, without intersecting the inside surface. The plurality of apertures should be drilled at angle and size corresponding angle of the nozzles and to the size of the outlets. In some embodiments, the angle is approximately 45 degrees. This is to ensure no air pressure is lost due to the apertures. In some embodiments, an adhesive or sealing material is used to prevent air pressure loss due to the apertures and to secure the nozzles in position.

Still referring to FIG. 1, when the air release trigger is activated, compressed air enters the chamber forcing the dry plant matter into a circular pattern 110 along the inside surface of the chamber. As the dry plant matter rotates, leaf matter is separated from the plant matter, i.e. *cannabis* leaves from *cannabis* flowers. The compressed air functions as a buffer between the inside surface of the chamber and the plant matter to prevent damage. After each rotation, more leaf matter is removed as the plant matter glides along the inside surface of the sphere and passes over the compressed air flow directed from the plurality of nozzles.

The apparatus further comprises an attached evacuation tube 111, a High-efficiency particulate arrestance (HEPA) filter 112, and collection device 113. The attached evacuation tube has a substantially U-shape, with a first portion connected to the chamber and a second portion removably connected to the HEPA filter and collection device. The collection device can be any container or bag for collecting plant matter and other unwanted particles. For instance, as the plant material rotates, dust and spores are evacuated via air pressure into the attached evacuation tube and corresponding HEPA filter and collection device. In some embodiments, the HEPA filter and collection device are attached in the form of a HEPA filter bag. The HEPA filter and collection device can be removed from the attached evacuation tube for inspection and to collect plant material, such as *cannabis* leaves. The attached evacuation tube may be permanently attached to the chamber or removably clipped on the chamber.

In some embodiments, the chamber is positioned at an operable height using a stand 115. This allows the user to comfortably access the chamber when loading and unloading plant matter. The stand may also be used to hold components. For instance, in some embodiments, the air compressor can be positioned on a shelfing unit located on the stand. Likewise, the air hose can be affixed to the stand.

Figure 2:
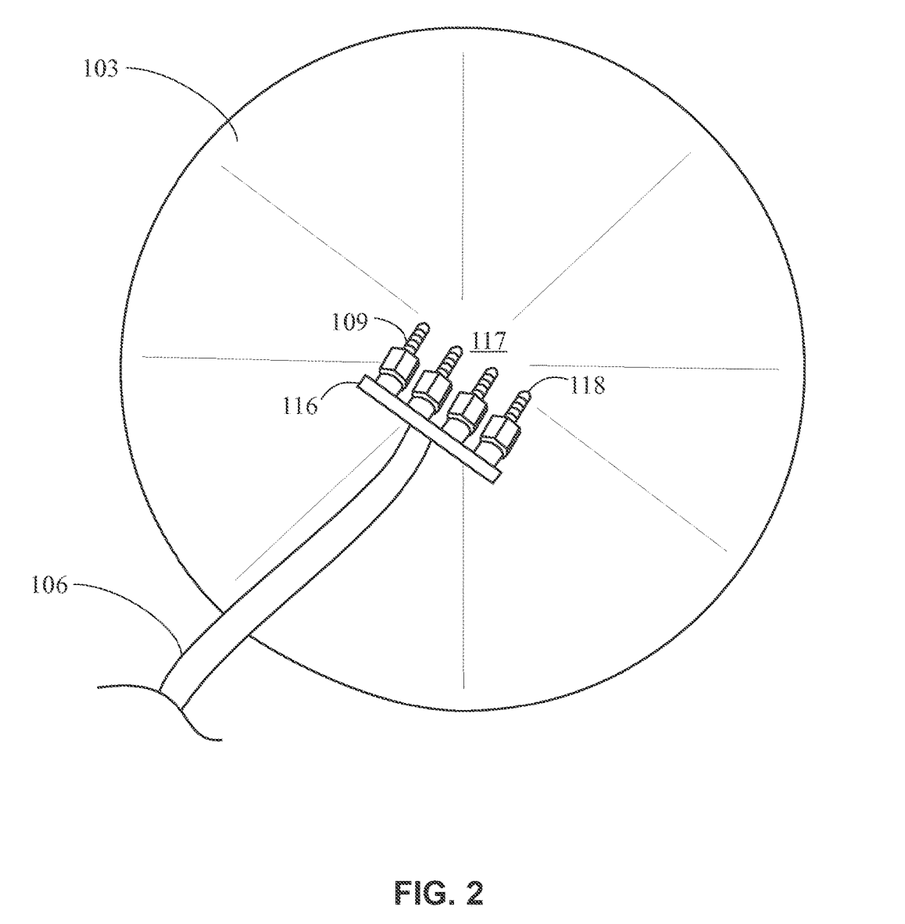
FIG. 2 is an exemplary bottom perspective view illustrating the apparatus for separating plant matter according to an embodiment of the present invention.

FIG. 2 is an exemplary bottom perspective view illustrating the apparatus for separating plant matter according to an embodiment of the present invention. Plurality of nozzles 109 are positioned on a center portion 117 on bottom portion 103 of the chamber. The center portion may be on the upward or downward slope of the bottom portion. In some embodiments, the plurality of nozzles is positioned on the downward slope in the center portion of the bottom portion and aimed at the center of the chamber. An air splitter 116 is used to split the compressed air deliver by air hose 106 to the plurality of nozzles. As previously mentioned, a plurality of apertures 118 designed to match the position of the plurality of nozzles is drilled into the bottom portion of the chamber. The plurality of apertures allows the nozzles, and specifically the compressed air to enter the chamber.

Figure 3:
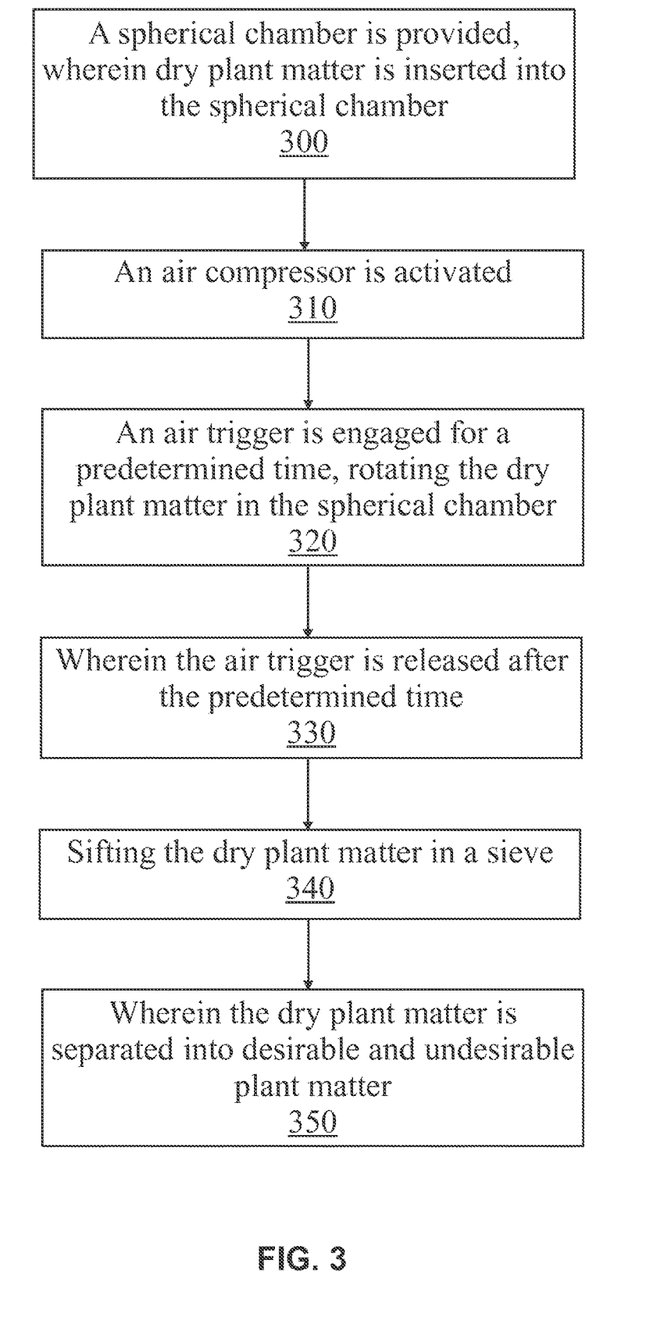
FIG. 3 is an exemplary flowchart illustrating a method for separating plant matter according to an embodiment of the present invention.

FIG. 3 is an exemplary flowchart illustrating a method for separating plant matter according to an embodiment of the present invention. In step 300, a chamber is provided and dry plant matter is inserted into the chamber. The quantity of dry plant matter should not exceed a prescribed fill line. In some embodiments, the dry plant matter is dry untrimmed *cannabis*. In step 310, an air compressor is activated. An air hose and a compressed air regulator are connected to the air compressor. The air hose leads into the chamber. In step 320, an air trigger is engaged for a predetermined time, rotating the dry plant matter in the chamber. The air trigger is used to control the flow of compressed air to the chamber. The predetermined time, is the time necessary for the plant matter to be separated as desired. For instance, the time required for *cannabis* leaves to be separated from *cannabis* flowers. In some embodiments, the predetermined time is approximately 15 seconds. The predetermined time varies, and is dependent on the quantity of plant matter used, as well as the operating compressed air pressure value. For instance, when a gentle operation is desired, the compressed air pressure value may be lowered and the predetermined time may be increased. In step 330, the air trigger is released after the predetermined time. When the air trigger is released, the rotation ceases, and the dry plant matter settles to the bottom of the chamber. In step 340, the dry plant matter is sifted in a sieve. In step 350, the dry plant matter is separated into desirable and undesirable plant matter. In some embodiments, the desirable plant matter is *cannabis* flowers and the undesirable plant matter is *cannabis* leaves. In another embodiment, the desirable plant matter is *cannabis* resin and the undesirable plant matter is *cannabis* leaves. In some embodiments, the sieve includes a sieve opening at a size to allow the quantity of undesirable plant matter to pass through. For instance, the sieve allows the *cannabis* leaves to pass through leaving the *cannabis* flowers.

Figure 4:
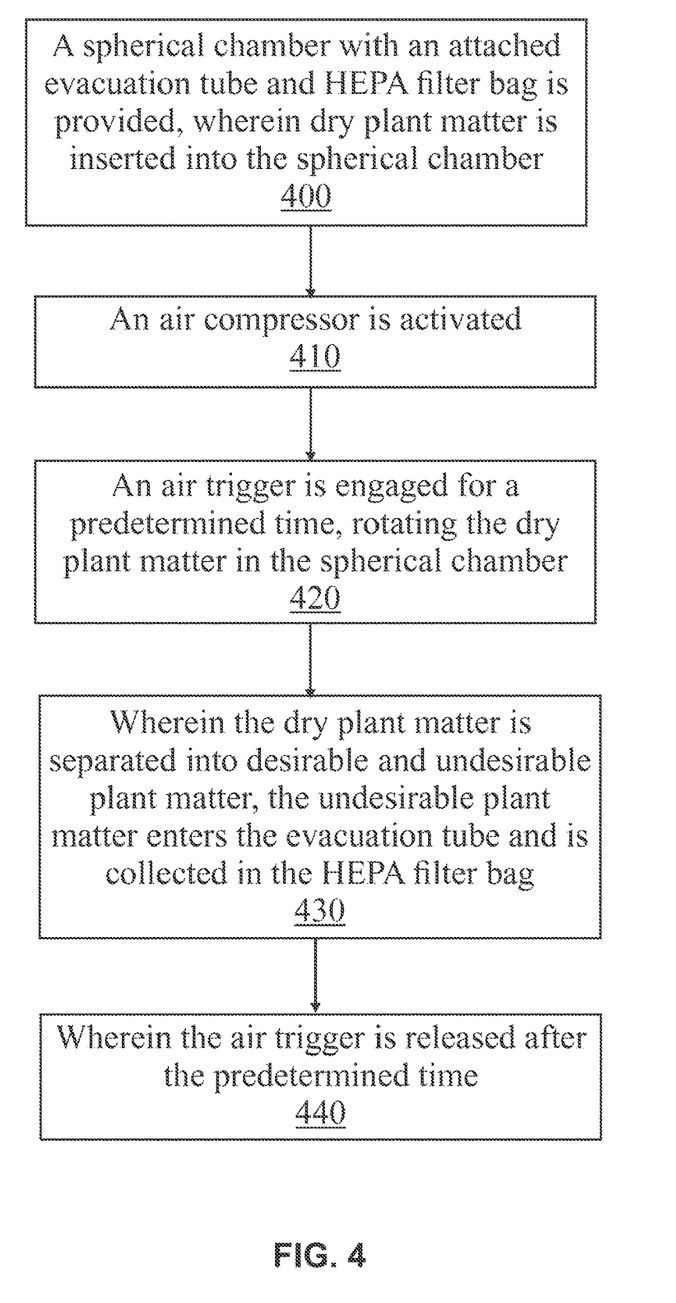
FIG. 4 is an exemplary flowchart illustrating a method for separating plant matter according to an embodiment of the present invention.

FIG. 4 is an exemplary flowchart illustrating a method for separating plant matter according to an embodiment of the present invention. In step 400, a chamber with an attached evacuation tube and HEPA filter bag is provided and dry plant matter is inserted into the chamber. The quantity of dry plant matter should not exceed a prescribed fill line. In some embodiments, the dry plant matter is dry untrimmed *cannabis*. In another embodiment, the dry plant matter is *cannabis* leaves. In step 410, an air compressor is activated. An air hose and a compressed air regulator are connected to the air compressor. The air hose leads into the chamber. In step 420, an air trigger is engaged for a predetermined time, rotating the dry plant matter in the chamber. The air trigger is used to control the flow of compressed air to the chamber. The predetermined time, is the time necessary for the plant matter to be separated as desired. For instance, the time required for *cannabis* leaves to be separated from *cannabis* flowers or *cannabis* resin to be separated from *cannabis* leaves. In some embodiments, the predetermined time is approximately 15 seconds. The predetermined time varies, and is dependent on the quantity of plant matter used, as well as the operating compressed air pressure value. For instance, when a gentle operation is desired, the compressed air pressure value may be lowered and the predetermined time may be increased. In step 430, the dry plant matter is separated into desirable and undesirable plant matter, and the undesirable plant matter enters the attached evacuation tube and collected into the HEPA filter bag. The undesirable plant matter as well as dirt, dust, and spores get evacuated via air pressure into the attached evacuation tube. In step 440, the air trigger is released after the predetermined time, ceasing the rotation, and settling the desirable plant matter to the bottom of the chamber for collection.

Figure 5:
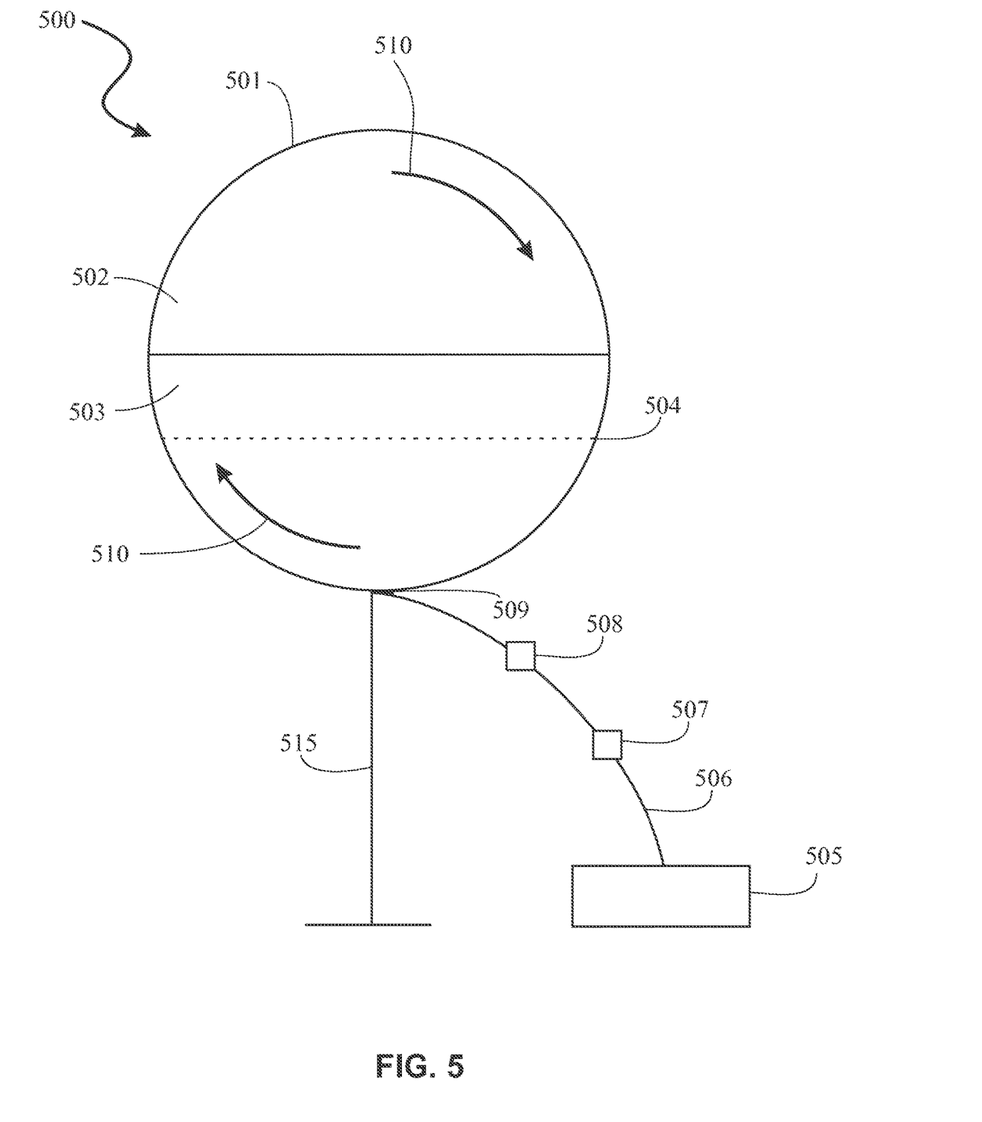
FIG. 5 is an exemplary diagram illustrating an apparatus for separating plant matter according to an embodiment of the present invention.

FIG. 5 is an exemplary diagram illustrating an apparatus 500 for separating plant matter according to an embodiment of the present invention. The apparatus comprises a chamber 501 having a top portion 502 and a bottom portion 503. The top portion is removably attached to the bottom portion in any method known in the art. For instance, the top portion may be attached via a hinge mechanism, or simply detached completely from the bottom portion when necessary. The chamber is made from a smooth material, including but not limited to plastic, acrylic, and glass. The inside surface of the chamber has a low coefficient of friction, having no edges or guides. In some embodiments, the chamber is transparent allowing a user to observe during operation. In a preferred embodiment, the chamber 501 is spherical but other embodiments, for purposes of illustration but not limitation, cylindrical, conical, torus, or spheroidal.

During use, dry plant matter is placed into the chamber, not exceeding a prescribed fill line 504. The dry plant matter can be a variety plant species; however the present invention works especially well with *cannabis* plants, and specifically dry untrimmed *cannabis*. Untrimmed *cannabis* includes *cannabis* flowers and *cannabis* leaves.

An air compressor 505 is used to deliver pressurized air to the chamber. It is preferred that the air compressor have a pressure capacity of at least 180 pounds per square inch (PSI). An air hose 506 is connected to the air compressor, the air hose having sufficient thickness necessary for the operating pressure, and sufficient length to reach the chamber. An air pressure regulator 507 designed to regulate and control the air pressure value, as well known in the art. During use, it is preferred that the air pressure regulator is set to 120 PSI. It is understood, that the operating pressure may be adjusted depending on requirements.

A release trigger 508 is used to control the flow of compressed air to the chamber. Specifically, when the release trigger is activated, compressed air is allowed to pass through until the trigger is released. Connected to the end of the air hose is a plurality of nozzles designed to direct the compressed air flow into the chamber. The plurality of nozzles may be one or more nozzles, and preferably four nozzles. The outlets of the plurality of nozzles are positioned on bottom center of the chamber, and specifically aligned with a slope of the bottom portion such that the compressed air flows along the slope of the chamber. In some embodiments, the plurality of nozzles is positioned so the compressed air flows along the upward slope of the chamber. In alternative embodiments, the plurality of nozzles is positioned so the compressed air flows along the downward slope of the chamber. In some embodiments, the plurality of nozzles is positioned on the downward slope of the chamber and aimed at the center of the chamber. It is critical that the outlets of the plurality of nozzles do not enter the chamber. A plurality of apertures designed to match the position of the plurality of nozzles are drilled into the bottom center portion of the chamber. The apertures allow the nozzles, and specifically the compressed air to enter the chamber. As mentioned previously, it is critical that the chamber be free from guides, which includes the plurality of nozzles. The outlets of the nozzles are aligned to the inside surface of the chamber, without intersecting the inside surface. The plurality of apertures should be drilled at angle and size corresponding angle of the nozzles and to the size of the outlets. In some embodiments, the angle is approximately 45 degrees. This is to ensure no air pressure is lost due to the apertures. In some embodiments, an adhesive or sealing material is used to prevent air pressure loss due to the apertures and to secure the nozzles in position.

Still referring to FIG. 5, when the air release trigger is activated, compressed air enters the chamber forcing the dry plant matter into a circular pattern 510 along the inside surface of the chamber. As the dry plant matter rotates, leaf matter is separated from the plant matter, i.e. *cannabis* leaves from *cannabis* flowers. The compressed air functions as a buffer between the inside surface of the chamber and the plant matter to prevent damage. After each rotation, more leaf matter is removed as the plant matter glides along the inside surface of the sphere and passes over the compressed air flow directed from the plurality of nozzles.

In some embodiments, the chamber is positioned at an operable height using a stand 515. This allows the user to comfortably access the chamber when loading and unloading plant matter. The stand may also be used to hold components. For instance, in some embodiments, the air compressor can be positioned on a shelfing unit located on the stand. Likewise, the air hose can be affixed to the stand.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For example, a computer may be used to control the operation of the apparatus, including programming the predetermined time and compressed air pressure, as well as activating the air trigger automatically. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A method, comprising steps:
    (a) inserting a quantity of dry plant matter into a chamber having a smooth inner surface, the chamber including a first hemisphere and a second hemisphere, wherein the first hemisphere is removably attached to the second hemisphere, and the second hemisphere includes at least an aperture;
    (b) activating an air compressor, the air compressor connected to an air hose, wherein the air hose is attached to at least a nozzle, wherein the nozzle penetrates the aperture without intersecting the smooth inner surface;
    (c) engaging an air trigger for a predetermined amount of time releasing a blast of air through the nozzle into the chamber, the blast of air regulated via a compressed air regulator;
    (d) forcing the quantity of dry plant matter into a circular pattern along the smooth inner surface of the chamber and the blast of air such that the quantity of dry plant matter is separated into a quantity of desirable plant matter and a quantity of undesirable plant matter; and (e) releasing the air trigger after the predetermined amount time.

2. The method of claim 1, wherein in step (a), the chamber includes an attached conduit in fluid communication with the chamber.

3. The method of claim 1, wherein in step (d), the quantity of dry plant matter is *cannabis*, the quantity of desirable plant matter is *cannabis* flowers, and the quantity of undesirable plant matter is *cannabis* leaves.

4. The method of claim 1, wherein in step (d), the quantity of desirable plant matter is *cannabis* resin and the quantity of undesirable plant matter is *cannabis* leaves.

5. The method of claim 1, further providing a step wherein the quantity of desirable plant matter and the quantity of undesirable plant matter are removed from the chamber and placed into a sieve.

6. The method of claim 5, wherein the sieve includes a sieve opening at a size to allow the quantity of undesirable plant matter to pass through.

7. The method of claim 2, wherein the quantity of undesirable plant matter is evacuated into the attached conduit.

8. The method of claim 7, further comprising a removable HEPA filter bag connected to the attached conduit, wherein the quantity of undesirable plant matter is collected in the removable HEPA filter bag.

9. The method of claim 8, wherein the removable HEPA filter bag collects a variety of unwanted particles including but not limited to dirt, dust, and spores.

10. A method for separating *cannabis* leaves from *cannabis* flowers, comprising steps:

(a) inserting a quantity of dry untrimmed *cannabis* comprising attached *cannabis* leaves and *cannabis* flowers into a chamber having a smooth inner surface, the chamber including an attached U-shaped tube in fluid communication with the chamber, the chamber having a first hemisphere and a second hemisphere, wherein the first hemisphere is removably attached to the second hemisphere, and the second hemisphere includes a plurality of apertures;

(b) activating an air compressor, the air compressor connected to an air hose, wherein the air hose is attached to a plurality of nozzles, wherein the plurality of nozzles penetrate the plurality of apertures without intersecting the smooth inner surface;

(c) engaging an air trigger for a predetermined amount of time releasing a blast of air through the plurality of nozzles into the chamber, the blast of air regulated via a compressed air regulator;

(d) forcing the quantity of dry untrimmed *cannabis* into a circular pattern along the smooth inner surface of the chamber and the blast of air such that the attached *cannabis* leaves are separated from the *cannabis* flowers creating a quantity of detached *cannabis* leaves;

(e) evacuating the quantity of detached *cannabis* leaves into the attached U-shaped tube having a removable HEPA filter bag to collect a variety of unwanted particles; and (f) releasing the air trigger after the predetermined amount time such that only the *cannabis* flowers remain in the chamber.

* * * * *